United States Patent
Bradley

(10) Patent No.: US 9,506,565 B2
(45) Date of Patent: Nov. 29, 2016

(54) METHOD OF SEALING A GAP

(71) Applicant: AIRBUS OPERATIONS LIMITED, Bristol (GB)

(72) Inventor: Jeremy Bradley, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 128 days.

(21) Appl. No.: 14/447,028

(22) Filed: Jul. 30, 2014

(65) Prior Publication Data

US 2014/0339729 A1   Nov. 20, 2014

Related U.S. Application Data

(63) Continuation of application No. 13/455,618, filed on Apr. 25, 2012, now Pat. No. 8,828,295.

(30) Foreign Application Priority Data

Apr. 27, 2011   (GB) .................................. 1107071.1

(51) Int. Cl.
*B29C 47/00* (2006.01)
*B29C 65/40* (2006.01)
(Continued)

(52) U.S. Cl.
CPC .............. *F16J 15/16* (2013.01); *B29C 47/004* (2013.01); *B29C 65/40* (2013.01); *F16J 15/14* (2013.01)

(58) Field of Classification Search
CPC .... F16J 15/14; B29C 47/04; B29C 47/0064; B29C 65/40
See application file for complete search history.

(56) References Cited

U.S. PATENT DOCUMENTS

| | | | |
|---|---|---|---|
| 3,709,650 A | 1/1973 | Gutoski et al. | |
| 4,100,240 A | 7/1978 | Bassani | |
| 5,154,321 A | 10/1992 | Shomer | |

(Continued)

FOREIGN PATENT DOCUMENTS

| | | |
|---|---|---|
| DE | 3611133 A1 | 10/1987 |
| DE | 10052108 A1 | 5/2002 |

(Continued)

OTHER PUBLICATIONS

Machine Translation of German Patent Publication No. DE-3611133A1, originally published Oct. 8, 1987, 3 pages.

(Continued)

*Primary Examiner* — William Bell
(74) *Attorney, Agent, or Firm* — Hauptman Ham, LLP

(57) ABSTRACT

A sealing unit for sealing a gap between a pair of surfaces, the apparatus comprising a nozzle for injecting sealant into the gap; two or more rollers; an endless track which passes round the rollers; and a curing device for directing energy into the gap to initiate cure of the sealant. The sealing unit is moved along the length of the gap. A sealant is injected into the gap from the nozzle and the track is rotated around the rollers as they are moved along the length of the gap. The track is pressed onto the first and second surfaces so the sealant in the gap is constrained by the track to lie substantially flush with the first and second surfaces. Energy is directed into the sealant with the curing device, the curing energy initiating cure of the sealant. The sealing unit is moved along the length of the gap at a rate such that the sealant becomes sufficiently cured when it is in contact with the track so that the track can be peeled away from the sealant as the track rotates round the second roller.

15 Claims, 4 Drawing Sheets

(51) Int. Cl.
*F16J 15/14* (2006.01)
*F16J 15/16* (2006.01)

(56) References Cited

U.S. PATENT DOCUMENTS

| | | | |
|---|---|---|---|
| 5,204,124 | A | 4/1993 | Secretan et al. |
| 5,810,956 | A | 9/1998 | Tanis et al. |
| 6,284,175 | B1 | 9/2001 | Luippold et al. |
| 7,918,958 | B2 | 4/2011 | Sauermann |
| 2003/0056894 | A1 | 3/2003 | Getz et al. |
| 2006/0073311 | A1 | 4/2006 | Hogg |
| 2008/0142164 | A1 | 6/2008 | Martinez |
| 2009/0267304 | A1 | 10/2009 | Wildman |
| 2010/0077695 | A1 | 4/2010 | Delort |
| 2010/0320325 | A1 | 12/2010 | Parikh et al. |
| 2011/0155321 | A1 | 6/2011 | Yang et al. |

FOREIGN PATENT DOCUMENTS

| | | | |
|---|---|---|---|
| DE | 102005062190 | B2 | 6/2007 |
| EP | 1413416 | A2 | 4/2004 |
| EP | 2070816 | A2 | 6/2009 |
| FR | 2483333 | A1 | 12/1981 |
| GB | 703562 | A | 2/1954 |
| GB | 1089952 | A | 11/1967 |
| JP | 8230048 | A | 9/1996 |
| WO | 2009118548 | A2 | 10/2009 |
| WO | 2010109605 | A1 | 9/2010 |

OTHER PUBLICATIONS

UK Search Report for Application No. GB1107071.1 mailed Aug. 26, 2011.

UK Search Report for Application No. GB0624562.5 mailed May 4, 2007.

UK Search Report for Application No. GB1008863.1 mailed Aug. 3, 2010.

International Search Report for PCT/GB2011/050973 mailed Dec. 2, 2011.

Extended European Search Report for Application No. EP 12165435 dated Aug. 21, 2012.

METHOD OF SEALING A GAP

CROSS-REFERENCE TO RELATED APPLICATIONS

This application is a continuation of U.S. application Ser. No. 13/455,618, filed Apr. 25, 2012, which claims priority from, Great Britain Application Number 1107071.1, filed Apr. 27, 2011, all of which are incorporated herein by reference in their entirety.

FIELD OF THE INVENTION

The present invention relates to a method and related apparatus for sealing a gap between first and second aerodynamic surfaces, for instance on an aircraft wing.

BACKGROUND OF THE INVENTION

The external aerodynamic surface of an aircraft wing is typically formed by joining together separately formed panels. Particularly if these panels are formed from a composite material, such as carbon fibre reinforced plastic, a gap will be present between the adjacent aerodynamic surfaces due to tolerances in the panel manufacturing process. Such a gap will cause turbulence when the aircraft is in use, decreasing its aerodynamic efficiency.

A conventional method of sealing such gaps is to manually tool into place a liquid sealant material to form a smooth fillet. However, the process is subject to human error and it is difficult to ensure a smooth fillet which lies precisely flush with the aerodynamic surfaces on either side of the gap.

The above limitations are undesirable on turbulent flow wing designs and unacceptable on laminar flow wing designs. Therefore, an alternative method of sealing such gaps is required.

SUMMARY OF THE INVENTION

A first aspect of the invention provides apparatus for sealing a gap between a pair of surfaces, the apparatus comprising a nozzle for injecting sealant into the gap; two or more rollers; an endless track which passes round the rollers; and a curing device for directing energy into the gap to accelerate cure of the sealant.

A second aspect of the invention provides a method of sealing a gap between first and second aerodynamic surfaces, the method comprising providing a nozzle, two or more rollers, an endless track which passes round the rollers, and a curing device; moving the nozzle, rollers and curing device at the same time along the length of the gap; and as they move along the gap:
  a. injecting a sealant into the gap from the nozzle;
  b. rotating the track around the rollers;
  c. pressing the track onto the first and second surfaces so the sealant in the gap is constrained by the track to lie substantially flush with the first and second surfaces; and
  d. directing energy into the sealant with the curing device, the curing energy accelerating cure of the sealant;
wherein the sealing unit is moved along the length of the gap at a rate such that the sealant becomes sufficiently cured when it is in contact with the track so that the track peels off from the sealant as it moves away from the first and second surfaces.

Typically the rollers include a first roller and a second roller, the second roller being positioned aft of the first roller; and the track has a sealing portion and a return portion between the first and second rollers, a first curved portion where it passes round the first roller, and a second curved portion where it passes round the second roller.

Preferably the sealing portion is substantially planar at all points between the first and second rollers. Further rollers may be provided in addition to the first roller and the second roller, or the apparatus may have only two rollers. The return portion may be substantially planar at all points between the first and second rollers, or may pass round further rollers so that it is not planar at all points between the first and second rollers.

The curing device may be integrated into the nozzle, but more preferably the curing device is arranged so as to direct energy into the gap through the track. In this case the curing device may be positioned outside the endless track and direct energy through the return portion as well as the sealing portion. However more preferably the curing device is positioned inside the endless track.

The curing process is accelerated by the curing device, either from a completely uncured state (in which case the curing process is initiated by the curing device) or from a partially cured state (in which the sealant has started curing slowly between the nozzle and the curing device)

Typically the curing device is arranged so as to direct energy through the first curved portion or the sealing portion of the track. Most preferably the curing device is arranged so as to direct energy through the sealing portion of the track.

Preferably the nozzle is positioned aft of the first curved portion of the track.

A sealant reservoir containing the sealant may be provided, along with a pipe for feeding the sealant from the reservoir to the nozzle.

The first and second aerodynamic surfaces may be on a land based vehicle, but more typically they are on an aircraft, preferably on the aircraft wing.

The gap may have no base, but more typically the gap comprises a channel with a base and a pair of side walls. Preferably the sealant substantially fills the channel as it is injected into it by the nozzle, so that it contacts the base and both side walls.

Typically a chassis is provided which supports the rollers and the curing device so the position of the curing device relative to the rollers can be maintained accurately during a sealing operation. Optionally the chassis may also support the nozzle so the parts are coupled together as a single sealing unit.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
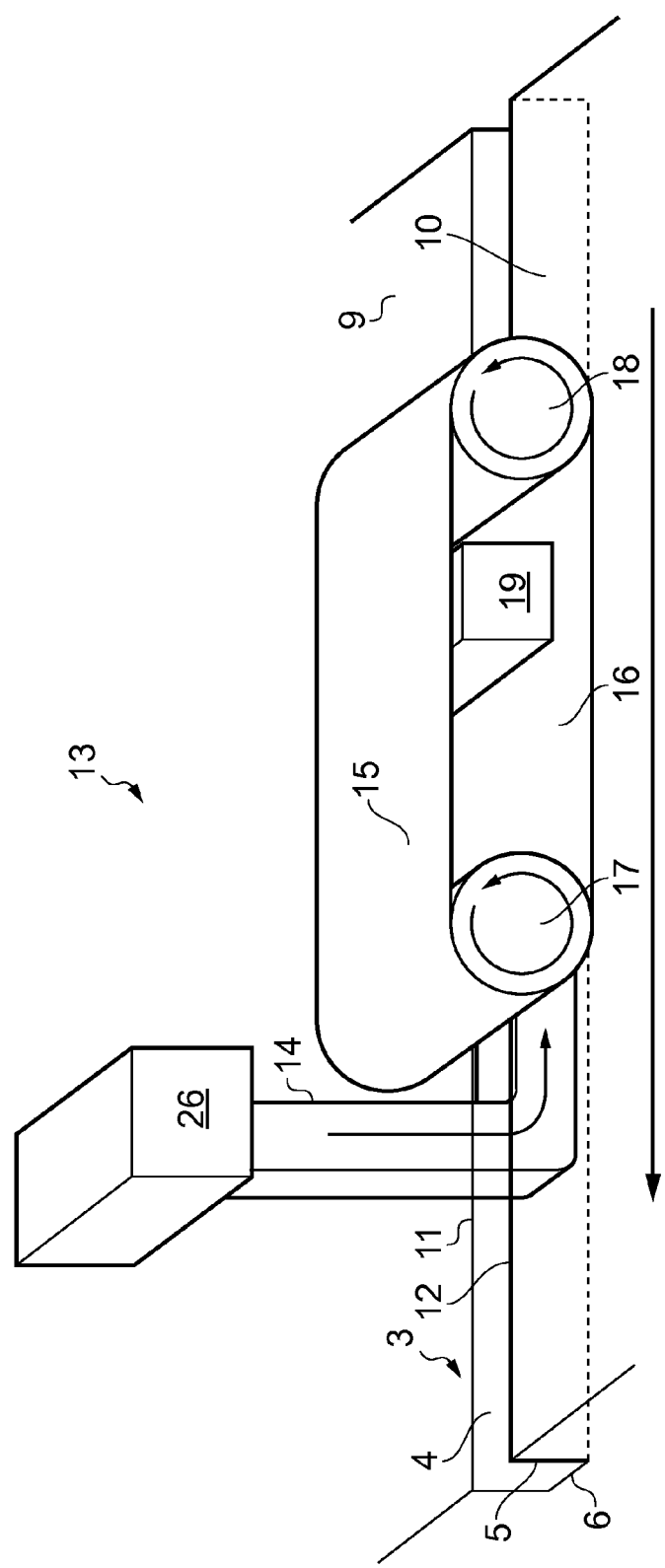
FIG. 1 is a schematic perspective view of a butt-joint between two adjacent aircraft wing panels being sealed by a sealing unit.

FIG. 1 is a perspective view of a joint between adjacent panels which form part of the surface of an aircraft wing.

The panels may be formed from a composite material, such as (for example) carbon fibre reinforced plastic, or from Aluminium alloy. A gap 3 is present between the opposed edges 4, 5 of the panels. The bottom of the gap is closed by a butt strap 6 so that it forms an elongate channel The panels have external aerodynamic surfaces 9, 10 which meet the opposed edges 4, 5 at respective corners 11, 12. The panels may be planar or curved.

The gap 3 between the surfaces 9, 10 is sealed with a sealing unit 13 in order to optimise the aerodynamic efficiency of the wing. The sealing unit 13 has a pipe 14 for injecting sealant into the gap, and a roller track assembly comprising an endless track and a pair of rollers 17, 18 which engage an inner surface 16 of the track. A curing device 19 is positioned inside the track between the rollers.

Typically the gap has a width of the order of 3-8 mm (which may vary along the length of the gap by up to 1 mm) and the pipe 14 has a width which is about 1 mm less than the width of the gap. Interchangeable nozzles could be used to suit a wide range of gap widths.

The track has a first curved portion 20 (labelled in FIGS. 2 and 3) where it passes round the first roller 17, a second curved portion 21 where it passes round the second roller 18, and a sealing portion 22 and return 23 portion between the first and second rollers.

The curing device 19 is positioned inside the track between the portions 22, 23 and arranged so as to direct energy 24 into the gap 3 through the sealing portion 22. The energy may be in the form of (for example) electromagnetic radiation in the ultra-violet, infra-red or microwave region; or ultrasound.

The track is formed from a flexible material which is sufficiently transparent to the curing energy. Example of suitable materials include polyethylene, PTFE or silicone rubber.

Figure 3:
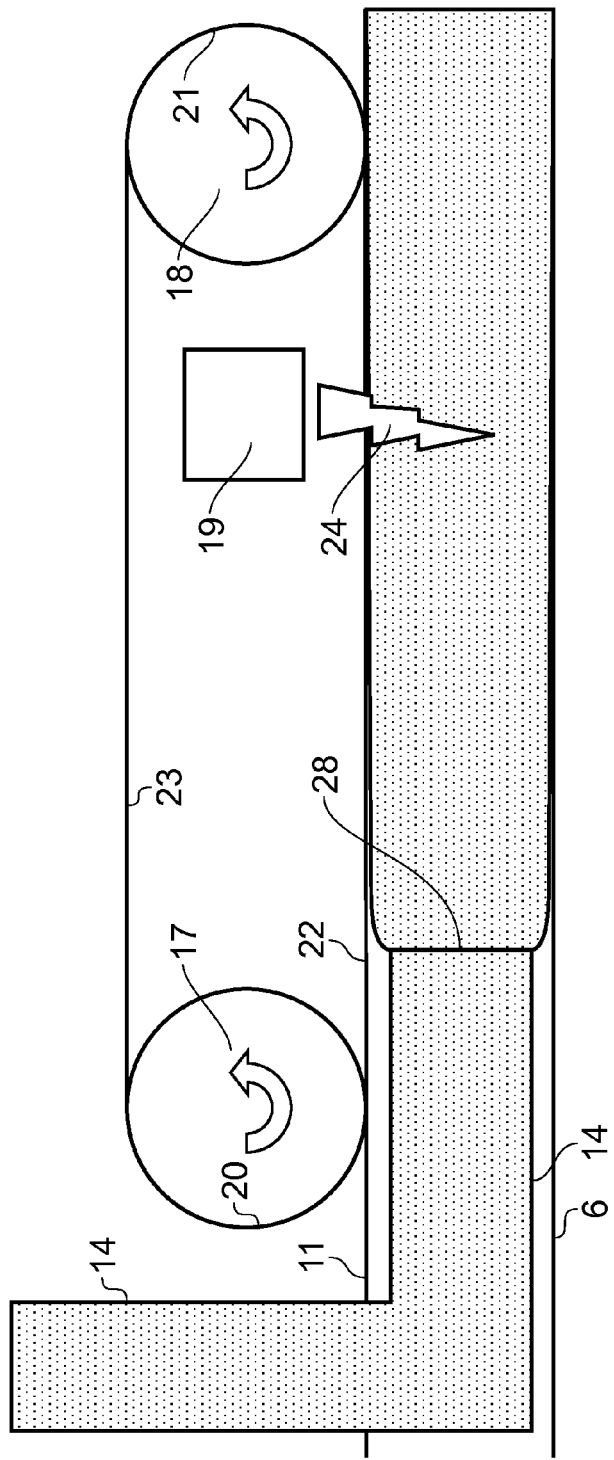
FIG. 3 is a sectional view of the apparatus of FIG. 1.

A sealant reservoir 26 shown in FIG. 1 contains a sealant liquid. The pipe 14 runs from the reservoir 26 to an outlet or nozzle 28 which is positioned under the track as shown in FIG. 3. The sealant liquid may for example be a polysulphide which is modified to enable free-radical, anionic or cationic cure initiation by UV light. Alternatively the sealant may be a polyurethane.

The sealing unit 13 may be a hand-held unit which is moved manually, or it may be moved automatically by a robot arm (not shown). In the case where a robot arm is used, then the robot arm may by driven along on rails using the first roller 17 (or another roller) as a driving wheel. Alternatively an overhead rail could be fitted to the wing jig to allow the unit 13 to drive and guide itself along the wing skin.

The unit 13 is moved to the left as indicated by the arrow in FIG. 1, so the second roller 18 is positioned aft of the first roller 17 relative to this direction of movement. The rollers rotate in the direction shown by the arrows in FIG. 3, and the track rotates around the rollers as they translate to the left. One or both of the rollers may be actively rotated by a motor (not shown) or they may be passive rollers which are rotated by the track and the frictional force between the outer surface 15 of the track and the panels.

The track is pressed onto the surfaces 9, 10 by the rollers 17, 18 either passively by the action of gravity or actively by applying pressure with, for example, a robot arm. The sealing portion 22 is held tight between the first and second rollers so that it seals against the surfaces 9, 10, giving the channel a closed cross-section between the rollers.

As the unit 13 is moved along the length of the gap, sealant is injected into the channel from the nozzle 28. As shown in FIG. 3, the nozzle 28 is positioned aft of the first curved portion 20 of the track so that the sealant is injected into the channel where it has a closed cross-section. The sealant fluid substantially fills the channel and is constrained by the sealing portion 22 of the track to lie substantially flush with the surfaces 9, 10.

The curing energy 24 initiates cure of the sealant, and the unit is moved along the length of the gap at a slow rate such that the sealant becomes sufficiently cured and "tack free" when it is still in contact with the sealing portion 22 of the track. This enables the track to be peeled away from the sealant with substantially none of the sealant adhering to the track as it rotates round the second roller 18 and away from the first and second surfaces.

Thus the sealing unit progresses along the channel leaving a partially or fully cured seal in its wake. In the case of partial cure a skin is formed on the sealant material which is tack free and rugged enough to protect the underlying material until full cure is achieved.

Figure 2:
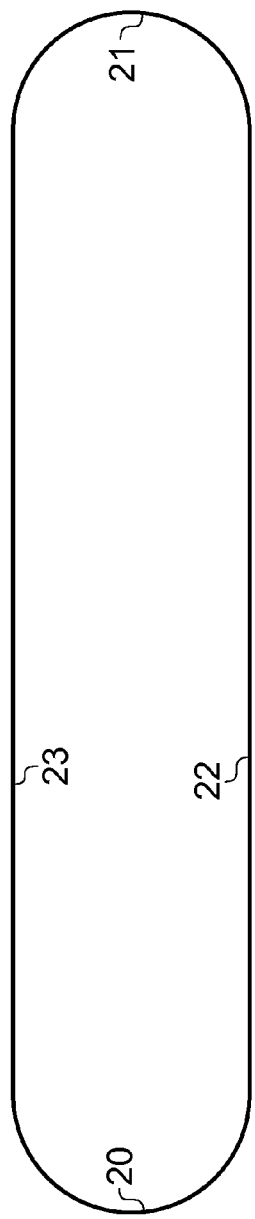
FIG. 2 is a side view of the endless track.
Figure 4:
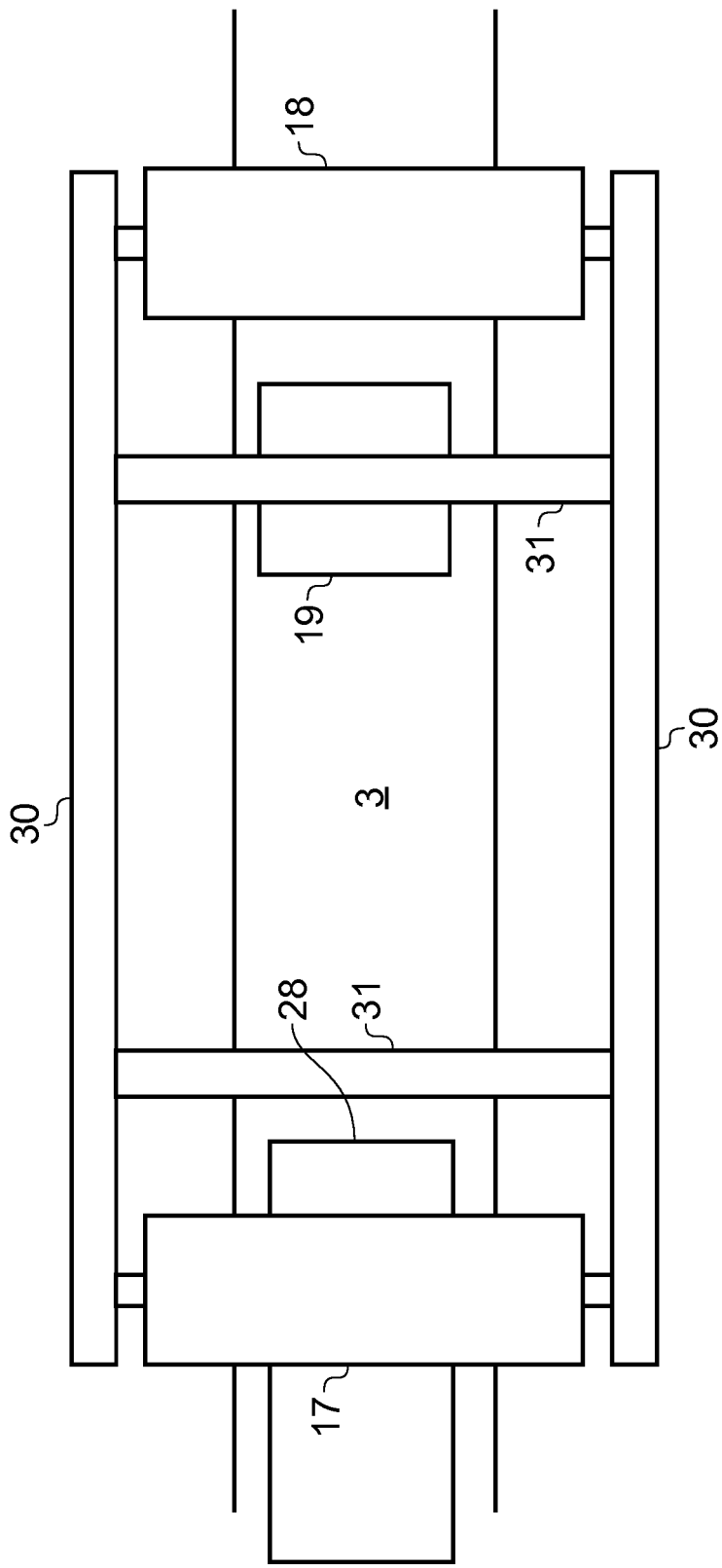
FIG. 4 is a plan view of the sealing unit positioned above the gap with the track removed.

FIGS. 1-3 are schematic views which omit the chassis supporting the rollers and curing device. FIG. 4 is a plan view of the unit 13 with the track removed so the chassis can be seen. The chassis comprises a pair of side bars 30 connected by a pair of cross bars 31. The rollers are mounted to the side bars 30 and the curing device 19 is mounted to one of the cross bars 31. The side bars 30 may be connected to a robot arm (not shown).

Figure 5:
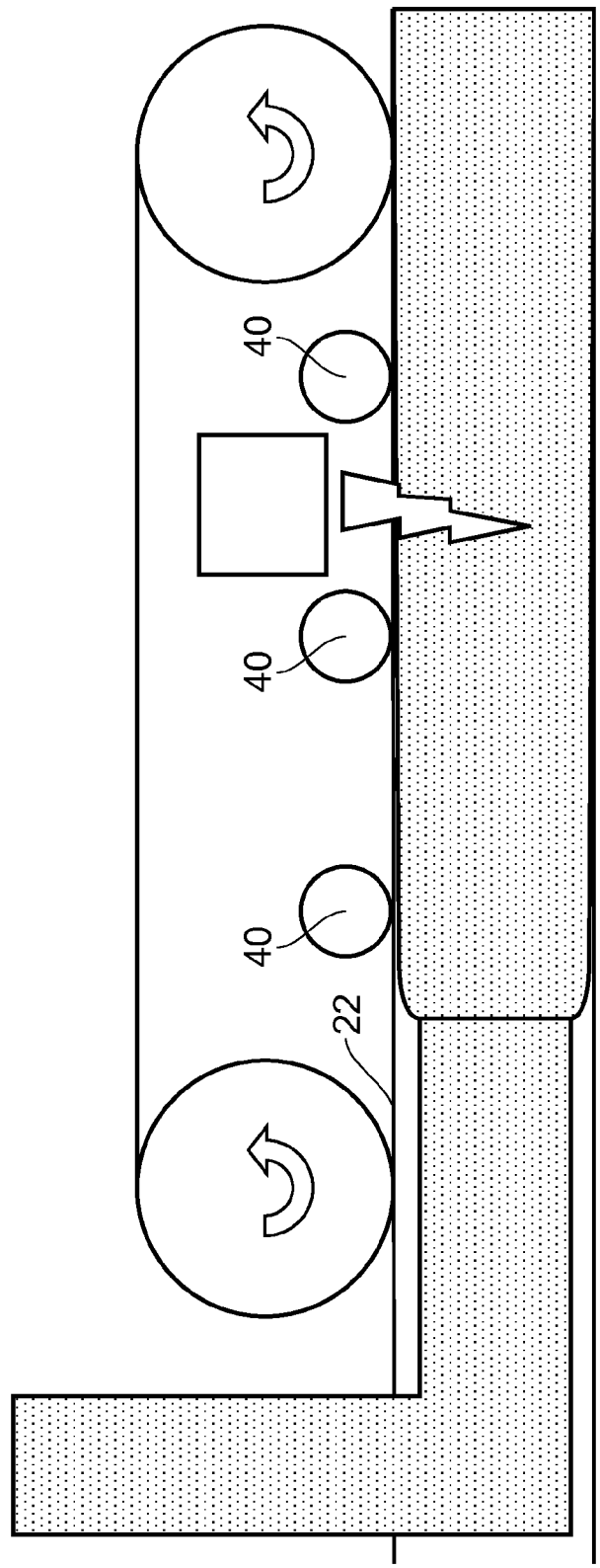
FIG. 5 is a sectional view of an alternative sealing unit.

FIG. 5 shows an alternative sealing unit in which three additional guide rollers 40 are provided to engage the sealing portion 22 of the track and prevent it from being pushed away from the panels by the sealant liquid in the channel.

Depending on the sealant material, the curing device may be integrated into the first roller 17. In this case the curing device could be arranged so as to direct energy through the first curved portion 20 of the track where it passes round the roller, or into the sealing portion 22 of the track aft of the roller 17. Alternatively the curing device may be integrated into the pipe 14, near the nozzle 28.

Although the invention has been described above with reference to one or more preferred embodiments, it will be appreciated that various changes or modifications may be made without departing from the scope of the invention as defined in the appended claims.

The invention claimed is:

1. Apparatus for sealing a gap between a pair of surfaces, the apparatus comprising a nozzle for injecting liquid sealant directly into the gap; two or more rollers; an endless track which passes round the rollers; and a curing device for directing energy into the gap to accelerate cure of the sealant.

2. The apparatus of claim 1 wherein the curing device is arranged so as to direct energy into the gap through the track.

3. The apparatus of claim 2 wherein the curing device is positioned inside the endless track.

4. The apparatus of claim 1 wherein the rollers include a first roller and a second roller, and wherein the track has:
   a. a sealing portion and a return portion between the first and second rollers,
   b. a first curved portion where it passes round the first roller, and
   c. a second curved portion where it passes round the second roller.

5. The apparatus of claim 4 wherein the curing device is arranged so as to direct energy through the first curved portion or the sealing portion of the track.

6. The apparatus of claim 4 wherein the sealing portion is substantially planar at all points between the first and second rollers.

7. The apparatus of claim 4 wherein the second roller is positioned aft of the first roller; and the nozzle is positioned aft of the first curved portion of the track and forward of the second curved portion of the track.

8. The apparatus of claim 4 further comprising one or more guide rollers which engage the sealing portion of the track.

9. The apparatus of claim 1 further comprising a sealant reservoir containing the sealant; and a pipe for feeding the sealant from the reservoir to the nozzle.

10. The apparatus of claim 1 further comprising a chassis which supports the rollers and the curing device.

11. A method of sealing a gap between first and second aerodynamic surfaces, the method comprising providing a nozzle, two or more rollers, an endless track which passes round the rollers, and a curing device; moving the nozzle, rollers and curing device at the same time along the length of the gap; and as they move along the gap:
   a. injecting a liquid sealant directly into the gap from the nozzle;
   b. rotating the track around the rollers;
   c. pressing the track onto the first and second surfaces so the sealant in the gap is constrained by the track to lie substantially flush with the first and second surfaces; and
   d. directing energy into the sealant with the curing device, the curing energy accelerating cure of the sealant;
   wherein the sealing unit is moved along the length of the gap at a rate such that the sealant becomes sufficiently cured when it is in contact with the track so that the track peels off from the sealant as it moves away from the first and second surfaces.

12. The method of claim 11 wherein the first and second aerodynamic surfaces are on an aircraft.

13. The method of claim 11 wherein the gap comprises a channel with a base and a pair of side walls; and wherein the sealant substantially fills the channel as it is injected into it by the nozzle.

14. The method of claim 11 wherein the energy is directed into the sealant from the curing device through the track.

15. The method of claim 11 wherein the rollers include a first roller and a second roller, the second roller being positioned aft of the first roller relative to their direction of movement; the track has a sealing portion and a return portion between the first and second rollers, a first curved portion where it passes round the first roller, and a second curved portion where it passes round the second roller, and the nozzle is positioned aft of the first curved portion of the track and forward of the second curved portion.

* * * * *